(12) United States Patent
Abbatiello

(10) Patent No.: US 8,376,586 B2
(45) Date of Patent: Feb. 19, 2013

(54) LOW-DIVERGENCE LIGHT POINTER APPARATUS FOR USE THROUGH AND AGAINST TRANSPARENT SURFACES

(76) Inventor: Robert J. Abbatiello, Niskayuna, NY (US)

( * ) Notice: Subject to any disclaimer, the term of this patent is extended or adjusted under 35 U.S.C. 154(b) by 400 days.

(21) Appl. No.: 12/779,723

(22) Filed: May 13, 2010

(65) Prior Publication Data

US 2010/0220482 A1 Sep. 2, 2010

Related U.S. Application Data

(60) Provisional application No. 61/318,270, filed on Mar. 26, 2010.

(51) Int. Cl.
*G02B 27/20* (2006.01)

(52) U.S. Cl. ........ 362/259; 362/109; 362/253; 345/157; 345/158; 345/163; 345/166; 372/4; 372/8; 372/109

(58) Field of Classification Search .................. 362/259, 362/553, 572, 573, 574, 577, 578, 579, 118, 362/119, 120, 166, 171, 197, 331.01, 287, 362/302, 253, 109; 345/157, 158, 163, 166; 372/4, 8, 109
See application file for complete search history.

(56) References Cited

U.S. PATENT DOCUMENTS

| | | |
|---|---|---|
| 4,160,285 A | 7/1979 | Shibla |
| 5,095,629 A | 3/1992 | Klemer et al. |
| 5,255,167 A | 10/1993 | Toussaint et al. |
| 5,268,829 A | 12/1993 | Lo |
| 5,307,253 A | 4/1994 | Jehn |
| 5,343,376 A | 8/1994 | Huang |
| 5,690,418 A | 11/1997 | Hsiung |
| 5,697,700 A | 12/1997 | Huang |
| 5,738,595 A | 4/1998 | Carney |
| 5,758,951 A | 6/1998 | Haitz |
| 5,764,224 A | 6/1998 | Lilja et al. |
| 5,803,582 A | 9/1998 | Huang |
| 5,838,431 A | 11/1998 | Hara et al. |
| 5,882,106 A | 3/1999 | Galli |
| 5,988,832 A | 11/1999 | Chen |
| 5,993,026 A | 11/1999 | Wu |
| 6,007,219 A | 12/1999 | O'Meara |
| 6,022,126 A | 2/2000 | Sekine et al. |
| 6,070,987 A | 6/2000 | Jarvik |
| 6,070,992 A | 6/2000 | Schnell |
| 6,132,064 A | 10/2000 | Bear |
| 6,142,650 A | 11/2000 | Brown et al. |
| 6,196,702 B1 | 3/2001 | Krietzman |
| 6,227,983 B1 | 5/2001 | Yang |
| 6,295,051 B1 | 9/2001 | Kanevsky et al. |
| 6,297,804 B1 | 10/2001 | Kashitani |
| 6,332,694 B1 | 12/2001 | Chih-Hsiung |

(Continued)

*Primary Examiner* — Evan Dzierzynski
*Assistant Examiner* — Danielle Allen
(74) *Attorney, Agent, or Firm* — Jay R. Yablon

(57) ABSTRACT

A light pointer apparatus and method of use comprising: a substantially flat bottom surface comprising a sufficiently large surface area such that when said substantially flat bottom surface is rested upon a substantially flat horizontal surface, said apparatus remains substantially immobile and stable relative to the substantially flat horizontal surface solely by virtue of the plane of contact formed between said substantially flat bottom surface and the substantially flat horizontal surface; a light source for emitting a low-divergence light beam comprising wavelengths in the visible light spectrum with a beam divergence of at most three degrees, fixed in orientation relative to said substantially flat bottom surface so as to emit said low-divergence light beam at a predetermined emission angle of at least 45 degrees relative to said substantially flat bottom surface; and surfaces other than said substantially flat bottom surface capable of being held and moved by a human hand.

53 Claims, 4 Drawing Sheets

U.S. PATENT DOCUMENTS

| | | |
|---|---|---|
| 6,374,158 B1 | 4/2002 | Fusaro, Jr. |
| 6,377,242 B1 | 4/2002 | Sweed |
| 6,417,840 B1 | 7/2002 | Daniels |
| 6,431,720 B1 | 8/2002 | Cheng |
| 6,431,732 B1 | 8/2002 | Brown et al. |
| 6,542,437 B1 | 4/2003 | Chen |
| 6,616,301 B2 | 9/2003 | Brown et al. |
| 6,715,904 B2 | 4/2004 | Naughton |
| 6,792,685 B1 | 9/2004 | Ng et al. |
| 6,799,868 B2 | 10/2004 | Brown et al. |
| 6,855,152 B2 | 2/2005 | Suhm et al. |
| 7,001,038 B2 | 2/2006 | Bock et al. |
| 7,031,875 B2 | 4/2006 | Ellenby et al. |
| 7,080,951 B2 | 7/2006 | Lin |
| 7,088,750 B2 | 8/2006 | Wu et al. |
| 7,160,197 B2 | 1/2007 | James |
| 7,234,265 B1 | 6/2007 | Cheng |
| 7,380,722 B2 | 6/2008 | Harley et al. |
| 7,380,723 B1 | 6/2008 | Oget |
| 7,418,016 B2 | 8/2008 | Gruhlke et al. |
| 7,423,632 B2 | 9/2008 | Huang et al. |
| 7,486,274 B2 | 2/2009 | Forlines et al. |
| 7,578,602 B2 | 8/2009 | Kajikuri et al. |
| D601,190 S | 9/2009 | Liu |
| 7,656,413 B2 | 2/2010 | Khan |
| 2002/0105804 A1* | 8/2002 | Li ................................. 362/253 |
| 2004/0141320 A1 | 7/2004 | Bock et al. |
| 2005/0128749 A1 | 6/2005 | Wilson et al. |
| 2007/0109783 A1 | 5/2007 | Wilson et al. |
| 2007/0247427 A1* | 10/2007 | Huang et al. .................. 345/163 |
| 2008/0030470 A1* | 2/2008 | Rensberger et al. .......... 345/163 |

* cited by examiner

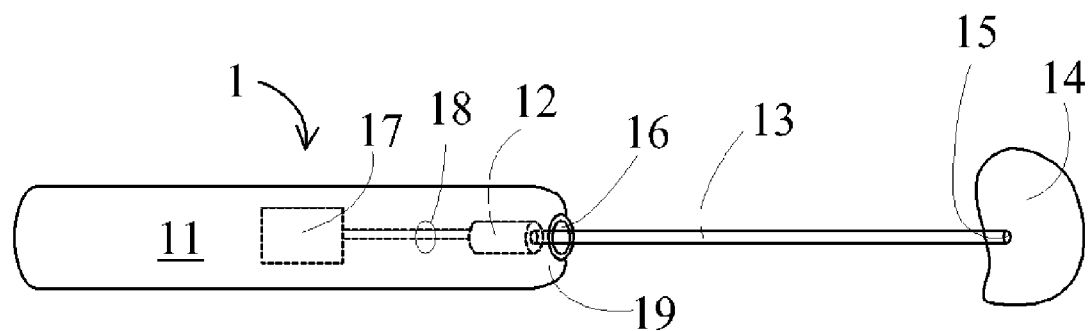
Figure 1: Prior Art
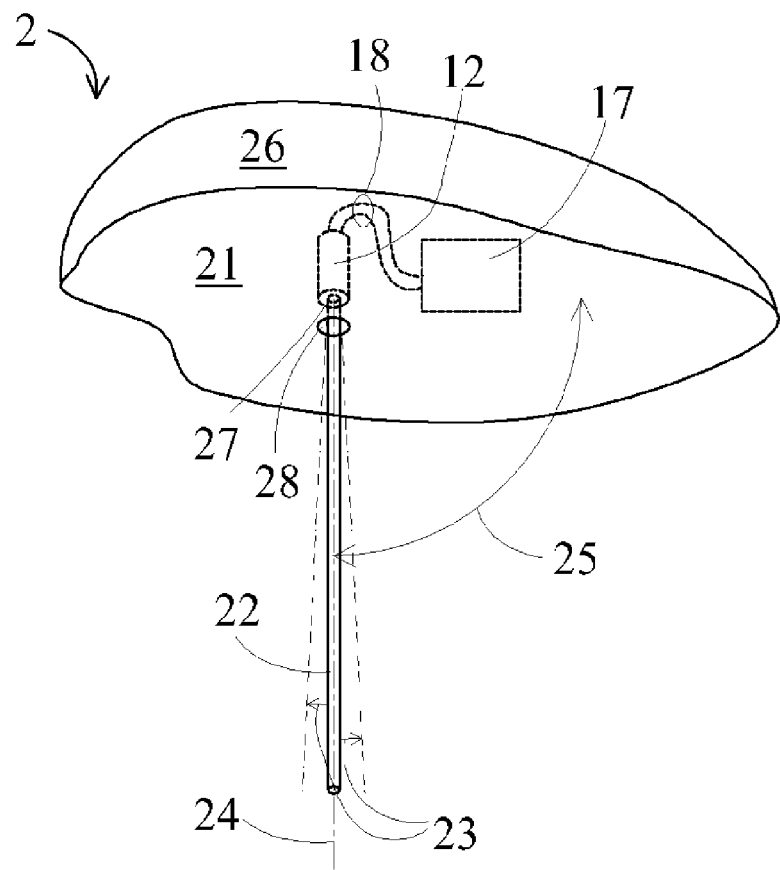
Figure 2

LOW-DIVERGENCE LIGHT POINTER APPARATUS FOR USE THROUGH AND AGAINST TRANSPARENT SURFACES

CROSS REFERENCE TO RELATED APPLICATIONS

This application claims benefit of provisional application U.S. 61/318,270 filed Mar. 26, 2010, which is hereby incorporated by reference.

BACKGROUND OF THE INVENTION

Certain mercantile establishments such as jewelers, candy shops, etc., make their living by selling comparatively small items which are displayed to customers under and/or behind glass or similarly transparent or partially transparent display case surfaces. The customer selects an item to examine and perhaps purchase, by pointing out to the merchant, the particular item on the opposite side of the display case surface which the customer wishes to inspect and/or purchase. But for comparatively small items, for example, jewelry, or candy items, which are often displayed close to one another, merely pointing to the desired ring, earring, watch, piece of chocolate, etc. with the customer's finger often requires several iterations of trial and error back and forth between the customer and the merchant before the merchant properly identifies which item the customer has in mind. The customer may point through the transparent or partially transparent display case surface and say "that one," to which the merchant may reply by picking out an item and inquiring "this one?" To which the customer may say "no, two over to the left." The merchant might then pick up another item and say "is this it?" To which the customer says "almost, but one row up." The merchant then finally picks up the correct item, says "this one?" And finally, the customer says, "yes, that one!" It would be desirable to eliminate this iterative process, and have available a device and associated method of use which enables the customer to designate which item he or she has in mind for selection, with no room for miscommunication, so that the merchant can retrieve the intended item immediately, correctly, always, the very first time around.

FIG. 1 illustrates a laser light pointer 1 in an elongated "pen" form commonly seen in the prior art. This "laser pen" has elongated handle/casing 11 which is customarily gripped with a user's palm and fingers wrapped around its circumferential perimeter. When actuated with an actuator (not shown), a light source 12 inside the light pen emits a laser light beam 13 through an aperture 16 situated at one end of the laser pen. This laser light beam 13, although not visible unless it is traveling through dust or mist or other particulate matter in the air, will, if aimed at an object 14, strike that object with a visible spot of light 15, as illustrated. Of course, for this spot to appear visible on the object 14, the laser light pointer 1 must produce light with wavelengths in the visible light spectrum, and the object must reflect at least some of the wavelengths of that light so it can be seen with an observer's eye. Such a light pen will also typically contain a power source 17 such as one or more batteries schematically illustrated by the box 17, connected 18 to light source 12, for example, by the schematically illustrated encircled pair of wires referenced by 18. Laser pens of this type are often used, for example, in professional or academic presentations, where a person is speaking while using visual aids, and uses the laser pen to point at particular parts of the visual aid to which the speaker wishes to refer his or her audience at any given moment.

Many such similarly-configured laser light pens are disclosed in the prior art documents disclosed in an information disclosure filed with this application. In virtually all instances, light source 12 is disclosed to be seated within light pointer 1 such that the propagation direction of light beam 13 is longitudinally aligned with the elongation of the handle/casing 11. Even for those few laser pointers which are not elongated and which combine a laser light source 12 with, for example, a computer mouse, such as those disclosed in U.S. Pat. No. 5,764,224; U.S. Pat. No. 6,295,051; U.S. Pat. No. 6,417,840; and U.S. Pat. No. 7,423,632; the light source 12 is configured such that the light beam 13 is projected from the end or the side of the mouse device, and not from its flat bottom surface.

While a customer shopping at a mercantile establishment as described earlier might be able to use such a light pen to point through a display case to select a particular object for the merchant to retrieve without ambiguity, the elongated shape and overall configuration of the light pen of FIG. 1 which represents virtually all the prior art in the field of light pointers, wherein the light propagation direction is longitudinally aligned with the elongation of the handle/casing 11, is not as conducive to selecting objects inside the display case, as other configurations to be disclosed herein which do not entail such an elongated casing aligned with the light propagation.

It would be desirable, in particular, to have available a light pointing device, specially configured and customized to solve the particular problem where a customer at a display counter wishes to select a particular object for retrieval by the merchant, without ambiguity. Such device itself, then becomes the vehicle through which the user shopping for merchandise displayed behind a display case can state to the merchant, without ambiguity: "That One™."

SUMMARY OF THE INVENTION

Disclosed herein is a light pointer apparatus and related method of use comprising: a substantially flat bottom surface comprising a sufficiently large surface area such that when said substantially flat bottom surface is rested upon a substantially flat horizontal surface, said apparatus remains substantially immobile and stable relative to the substantially flat horizontal surface solely by virtue of the plane of contact formed between said substantially flat bottom surface and the substantially flat horizontal surface; a light source for emitting a low-divergence light beam comprising wavelengths in the visible light spectrum with a beam divergence of at most three degrees, fixed in orientation relative to said substantially flat bottom surface so as to emit said low-divergence light beam at a predetermined emission angle of at least 45 degrees relative to said substantially flat bottom surface; and surfaces other than said substantially flat bottom surface capable of being held and moved by a human hand.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below.

FIG. 1 illustrates an elongated laser light pen, in the form that is customary and widely employed in the prior art.

FIG. 2 is a lower-side plan view, schematically (as signified by the oddly-shaped bottom) illustrating a light pointer apparatus in a preferred embodiment of the invention.

DETAILED DESCRIPTION

Figure 3:
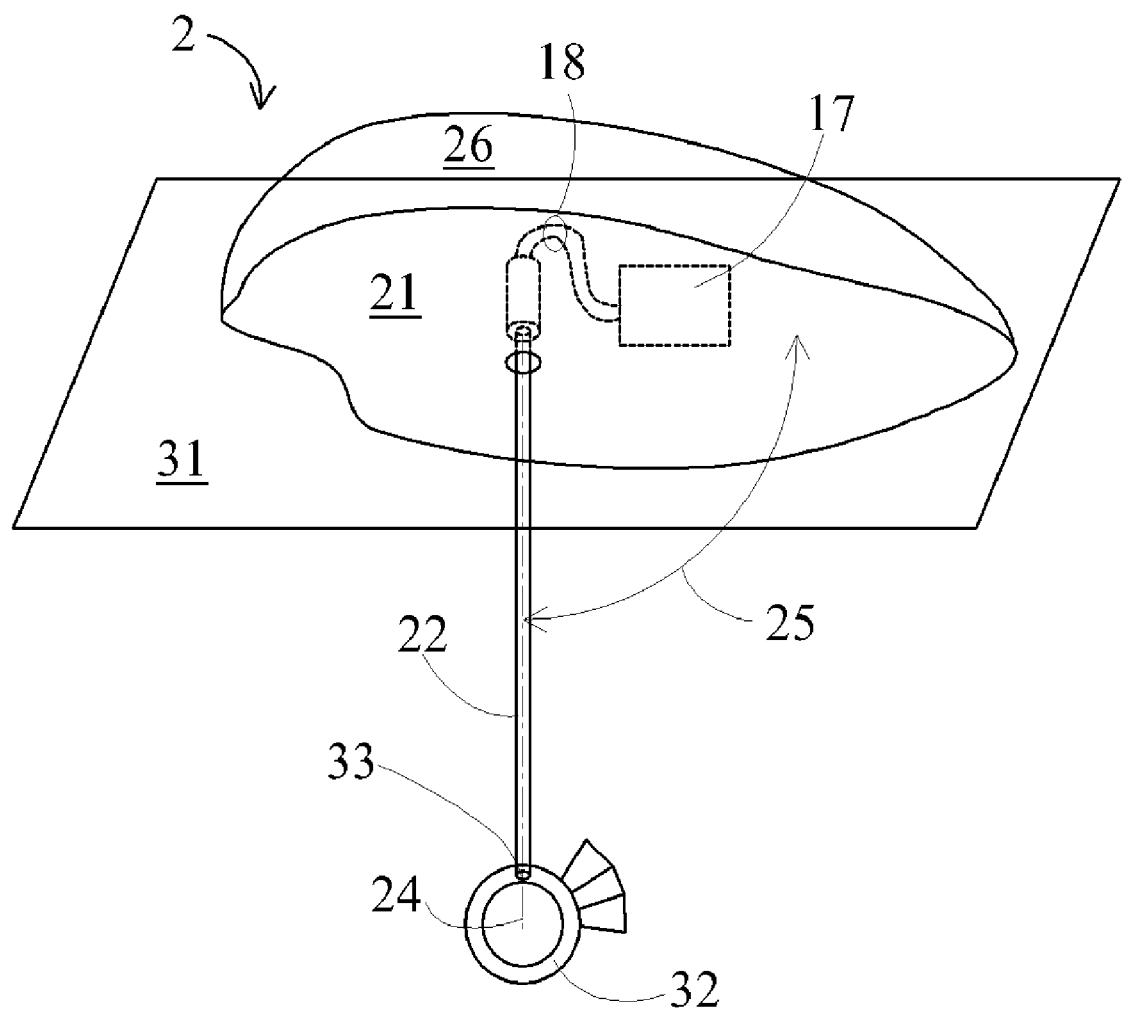
FIG. 3 illustrates a method of using the invention, and the important role played by configuring the apparatus of the invention with a substantially flat bottom surface comprising a sufficiently large surface area such that when the substantially flat bottom surface is rested upon a substantially flat horizontal surface, the apparatus remains substantially immobile and stable relative to a substantially flat horizontal surface solely by virtue of the plane of contact formed between the substantially flat bottom surface and the substantially flat horizontal surface.

FIG. 2 schematically illustrates a light pointer apparatus 2 in accordance with a preferred embodiment of the invention, employing a light source 12 similar or even identical to the types of light sources used in the prior art laser pens illustrated in FIG. 1. However, the light source 12 is set behind a substantially flat bottom surface 21 of light pointer apparatus 2. Light source 12 is preferably a laser light source similar or identical to the types of laser light sources used in laser pens. The light exits light source 12 through light source exit portal 27 and exits substantially flat bottom surface 21 through a bottom surface exit portal 28. However, light source 12, whether laser-type or some other type, needs in all cases to emit a low-divergence light beam 22 with a beam divergence angle 23 of at most three (3) degrees about an emission line 24, and as small as two (2) degrees or one (1) degree or even less. This will be most easily achieved if, as preferred, light source 12 is a laser light source such as those utilized in the prior art laser pens illustrated in FIG. 1. Nonetheless, it is possible to also utilize non-laser light sources within the scope of this disclosure and its associated claims so long as the light source produces such a low-divergence beam with a beam divergence of at most three degrees. Light source 12 should also emit a light beam 22 comprising wavelengths in the visible light spectrum.

As distinguished from prior art laser pens represented by FIG. 1 in which light source 12 is set behind a forward end 19 of the light pen which has negligible surface area, and is fixed to project light beam 13 longitudinally aligned with an elongated handle/casing 11, the substantially flat bottom surface 21 of light pointer apparatus 2, in many preferred embodiments, has a more substantial surface area of at least three (3) square inches, as will be elaborated in more detail momentarily. Further, light source 12 is fixed in orientation relative to this substantially flat bottom surface 21 so as to emit the low-divergence light beam 22 at a predetermined emission angle 25 of at least 45 degrees relative to substantially flat bottom surface 21, not in the sort of longitudinal alignment with the pen body that appears to be virtually exclusively disclosed in the prior art. In a preferred embodiment, this predetermined emission angle 25 is a substantially perpendicular angle of 90 degrees, as illustrated in FIG. 2. However, this angle may be continuously varied over the entire range running from 45 degrees to 90 degrees, including, for example at least 50, 55, 60, 65, 70, 75, 80 and 85 degrees. It is possible as will be discussed later in connection with FIG. 6, for this fixed angular orientation to be adjustable.

Light pointer apparatus 2 also comprises surfaces 26 other than the substantially flat bottom surface 21, capable of being held and moved by a human hand. It also contains within (illustrated by "hidden" lines), a power source 17 such as one or more batteries schematically illustrated by the box 17, connected to light source 12, for example not limitation, by the encircled pair of wires 18.

The benefit of this configuration, as is now illustrated in FIG. 3, is that if light source 12 is actuated (emitting light) during the same time that its substantially flat bottom surface 21 is in contact with a transparent or partially transparent substantially flat surface 31 such as, but not limited to, the glass surface of a jewelry display case, then the low-divergence light beam 22 will pass through transparent or partially transparent substantially flat surface 31, relative to this surface 31, stabilized at substantially the same predetermined emission angle 25. That is, the at least three square inch surface area of substantially flat bottom surface 21 of many preferred embodiments, when placed in contact with transparent or partially transparent substantially flat surface 31, provides a stable plane of contact between the two surfaces 21 and 31, so that the emission angle 25 of low-divergence light beam 22 through transparent or partially transparent substantially flat surface 31 a) will be substantially identical to the emission angle of low-divergence light beam 22 relative to substantially flat bottom surface 21, and b) will be stabilized against any vagaries of the user's hand movement or hand stability, due to the stable plane of contact. In total effect, transparent or partially transparent substantially flat surface 31 becomes something of a "straight edge plane" used to stabilize the direction of travel of low-divergence light beam 22, by virtue of its face to face contact with substantially flat bottom surface 21.

With this stable plane of contact, a user of light pointer apparatus 2, by holding the surfaces 26 other than the substantially flat bottom surface 21 with the user's hand while the low-divergence light beam 22 is actuated, is enabled to cause light from low-divergence light beam 22 to visibly strike a selected object 32 on the opposite side of transparent or partially transparent substantially flat surface 31 relative to the light pointer apparatus 2, while the substantially flat bottom surface 21 is in contact with the transparent or partially transparent substantially flat surface 31, by moving light pointer apparatus 2 over the transparent or partially transparent substantially flat surface 31 and causing said low-divergence light beam 22 to pass through the transparent or partially transparent substantially flat surface 31 and visibly strike 33 a selected object 32 on the opposite side.

In the illustration of FIG. 3, the transparent or partially transparent substantially flat surface 31 is taken to be the surface of a jewelry display case at a mercantile establishment, and the selected object 32 is illustrated to be a jewelry item, here, a ring. It is, however, to be understood that this is wholly an exemplary illustration, and does not in any way restrict the scope of use of the invention to jewelry cases or to selected objects 32 which are jewelry. In the illustration of FIG. 3, the strike 33 of the light against the selected object 32 is illustrated to be a circular spot, but this too is exemplary and not limiting, and it is envisioned that other shapes of light besides circular spots can be used to strike the selected object. For example, not limitation, the light "spot" may be not only circular, but, e.g., an "arrow," a triangle, square or other polygon, a "star," a line, or any other geometric shape. Further, the shape can be varied by, for example, placing a suitably-shaped template (not shown) over light source exit portal 27 or bottom surface exit portal 28 (see the numbering in FIG. 2) so as to change the shape of the projected light spot, in accordance with practices well known in the light projection arts.

It should be apparent that this stabilization brought about by the contact between the two surfaces 21 and 31 would not be possible using an ordinary light pen such as that in FIG. 1, because the forward end 19 of the light pen in FIG. 1 does not possess sufficient surface area to establish the stable plane of contact that is disclosed in FIG. 3. In particular, light pen configurations such as those of FIG. 1 are incapable of being used in the manner illustrated in FIG. 3, do not anticipate or suggest the FIG. 3 configuration or result, and provide no motivation toward the FIG. 3 configuration or resulting use. The light pointer apparatus 2 schematically illustrated in FIG. 2, provides a simple, stable, reliable light pointer apparatus which a customer looking at merchandise or food items behind a transparent or partially transparent display case can use to say, without ambiguity, "That One™."

Now, although FIGS. 2 and 3 were drawn to illustrate the general, schematic features of the invention, the precise shape of light pointer apparatus 2 can be varied largely at will. Further, the statement that the substantially flat bottom surface 21 should be of at least three square inches in surface area in many preferred embodiments, is one exemplary statement of how one implements the above-cited "straight edge plane" stabilization brought about by the contact between the two surfaces 21 and 31. In the alternative, one may require the substantially flat bottom surface 21, irrespective of its precise "shape," to have diameter of at least 2 inches across, as measured from all angles. This means that from any angle of measurement, the radius r will be at least 1 inch across, and the surface area S will then be at least $S=\pi \cdot r^2=3.14\ldots$ square inches, and for the limiting case in which the shape is a precise circle with 2 inch diameter, this area will be exactly equal to $\pi$ square inches.

With these two exemplary statements in mind, as well as the above discussion about forming a stable plane of contact, perhaps the best way to specify this is functional: that the substantially flat bottom surface 21 comprises a sufficiently large surface area such that when the substantially flat bottom surface 21 is rested upon a substantially flat horizontal surface, the light pointer apparatus 2 remains substantially immobile and stable relative to the substantially flat horizontal surface solely by virtue of the plane of contact formed between substantially flat bottom surface 21 and the substantially flat horizontal surface, and that these two surfaces acting solely in accordance with the laws of physics will rest against one another in a stable configuration without the need for any intervention to maintain that stability. Clearly, an ordinary light pen would not and could not perform in this fashion: If an elongated prior art light pen such as that represented by of FIG. 1 was to be rested upon a substantially flat horizontal surface with the components referenced by 16 and 19 contacting the substantially flat horizontal surface, then even if a portion of the surface referenced by 16 and 19 was taken to be "substantially flat," the light pen, rested on its "end point," would not be stable or remain immobile. Rather, immediately after the user "lets go," or, following even the mildest jostling or vibration, the light pen would fall to one side according to the laws of physics. Thus, a light pen configured such as in FIG. 1 does not comprise a sufficiently large surface area such that when the substantially flat bottom surface 21 is rested upon a substantially flat horizontal surface, it remains substantially immobile and stable relative to the substantially flat horizontal surface solely by virtue of a the plane of contact formed between substantially flat bottom surface 21 and the substantially flat horizontal surface, as do the light pointer apparatuses 2 of FIGS. 2, 3, 4 and 6. All of these apparatuses 2, would remain substantially immobile and stable, even in the face of heavy jostling or vibration, short of active, physical, user intervention.

Having reviewed the basic principles of operation of light pointer apparatus 2, let us now review several specific embodiments of this invention, as well as certain safety features designed to ensure that a user's eyes do not sustain accidental damage from the emitted low-divergence light beam 22.

First, as noted above, the precise shape of light pointer apparatus 2 can be varied largely at will. One preferred embodiment is in the shape of a computer "mouse," because the mouse shape is particularly well-suited to ergonomic comfort. This is illustrated by FIG. 4, which shows a mouse shape that is generally ovular, though it is to be understood that any sort of mouse shape is regarded to fall within the scope of this disclosure and its associated claims.

Figure 6:
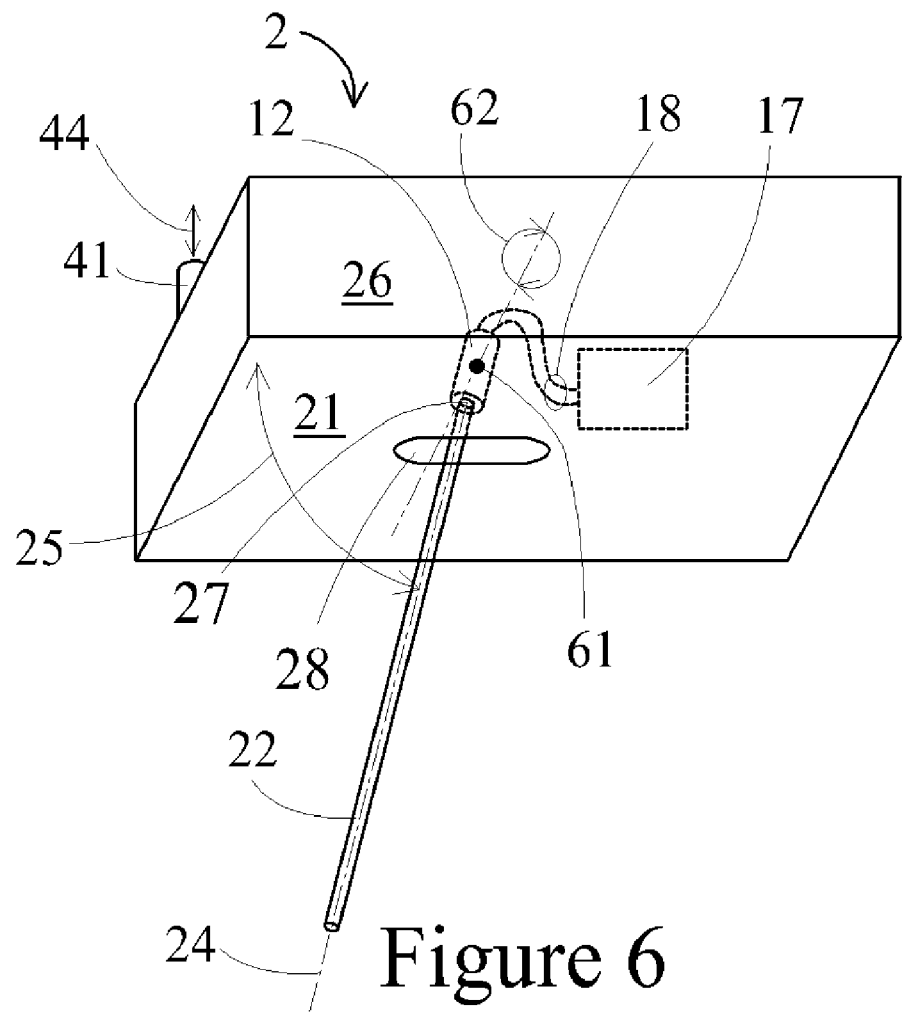
FIG. 6 illustrates a lower-left side-front perspective view of another preferred embodiment of the invention, configured in a cuboid shape, and also, wherein the predetermined light emission angle is adjustable at will.

Particularly, when it is stated that these surfaces 26 other than the substantially flat bottom surface are capable of being held and moved by a human hand, it is intended that there be a reasonably-comfortable ergonomic fit with both the palm and fingers of the human hand, not dissimilar to that which is implemented by a computer mouse. In this regard, one should keep in mind that some people are right handed and others left handed so that the positioning of the first safety actuator 41 to be momentarily discussed, should, in general, be convenient and comfortable for users of either handedness. FIG. 4, as an exemplary, non-limiting illustration, is more comfortable for right-handed users because the first safety actuator 41 is on the left side proximate where the pointer finger of the right hand would be naturally situated. A first safety actuator 41 that is instead "centered" in the position of many mouse "wheels," as is illustrated in FIG. 6, may provide optimal ergonomic comfort for users of either hand.

Figure 4:
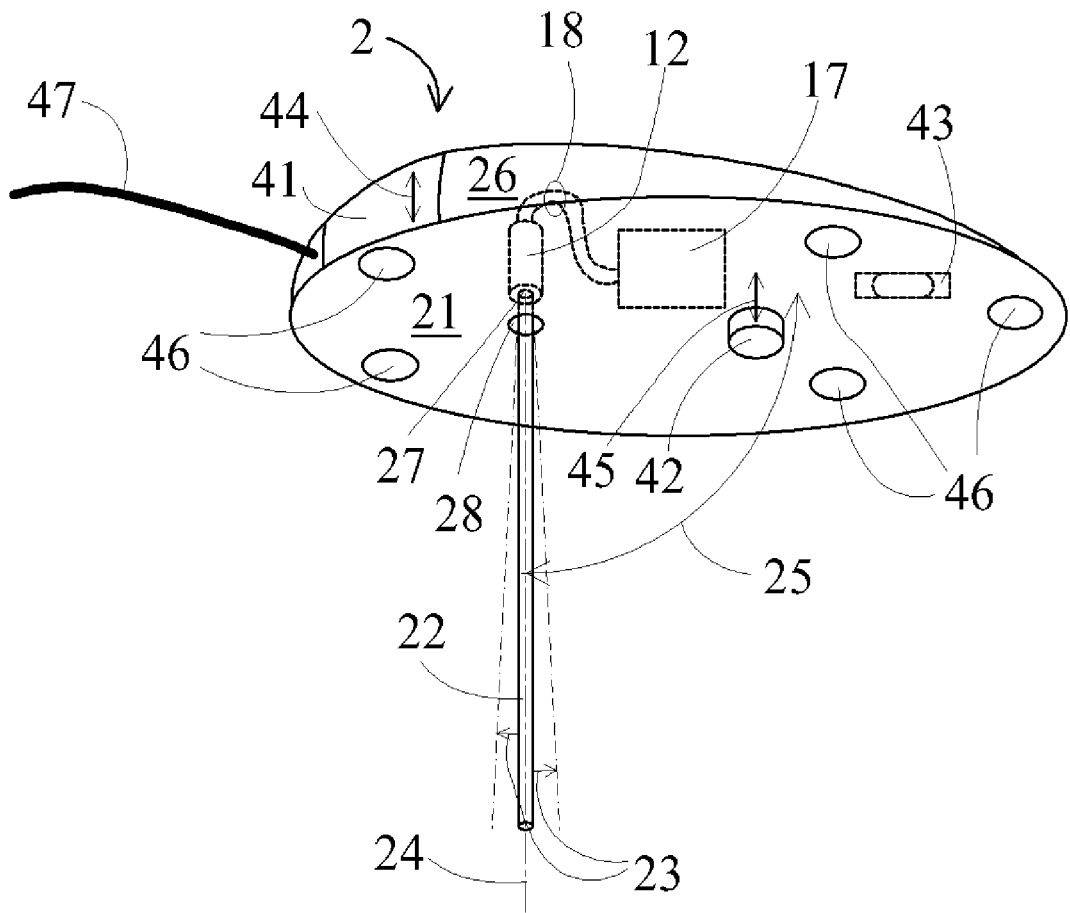
FIG. 4 illustrates a lower-side perspective view of a preferred embodiment of the invention, configured in shape and ergonomic design similarly to a computer mouse, and with various additional features also illustrated including various modes of actuation intended to protect a user's eye from accidental light exposure.

FIG. 4 also illustrates the actuation of various embodiments of the invention, to now be reviewed in detail, and how this relates to user safety. To begin with, it is to be kept in mind that any light source, and especially a laser light source even if low-powered as is most appropriate for this invention, can do damage if the laser light is shined into a person's eye for any period of time. Thus, the invention has a number of features which facilitate eye safety. First, if light source 12 is in fact a laser light source as is preferred, it is best for this light source to be a class 2 or class 3 laser source or equivalent, consistent with prevailing safety laws and regulations, since these sources are not as potentially damaging as are other types of laser light source. Further, FIG. 4 illustrates light pointer apparatus 2 comprising three safety actuators 41, 42, 43 for causing light source 12 to emit the low-divergence light beam 22 only when all three of the safety actuators are actuated, and for ceasing emission of said low-divergence light 22 beam whenever any one of these three safety actuators 41, 42, 43 is not actuated.

In the particular embodiment illustrated in FIG. 4, which may be varied in accordance with ordinary skill in the art within the scope of this disclosure and its associated claims, the first one of said three safety actuators, 41, shown to resemble a mouse button (but subject to ordinary skill variation), is configured to be actuated by the user's hand by depression and release in the down and up direction 44 as illustrated. It is highly preferred that when the user is not depressing actuator 41, this actuator will default so as be "up" and "not actuated," just like a regular mouse button that has a mild spring pressure which causes it to stay up and be in a "not actuated" state when it is not being depressed down by the user. The second one of these three safety actuators, 42, is configured to be actuated by the substantially flat bottom surface 42 contacting the transparent or partially transparent substantially flat surface 31 of FIG. 3. This second actuator will be in a default "down/extended" state of no actuation, also moving in the up and down direction 45, and will only become actuated when light pointer apparatus 2 is rested upon a surface such that the weight of light pointer apparatus 2 is sufficient to depress this second actuator into substantial alignment with the plane of substantially flat bottom surface 21, and so cause it to actuate. As soon as light pointer apparatus 2 is lifted from the surface, this second actuator returns to its default extended position, and is not actuated. The third one of the three safety actuators, 43, contained within light pointer apparatus 2 in this illustration, comprises a level sensor for sensing an orientation of light pointer apparatus 2. This actuates only when light pointer apparatus 2 is sensed to be in a predetermined orientation: in this illustration, for example not limitation, with its flat bottom surface 21 in a substantially horizontal plane. For example, not limitation, this third, level-sensing actuator may comprise a mercury tilt switch, or any other suitable level sensor known to persons of ordinary skill which is capable of sensing a level state within some number of rotational degrees, and causing an electronic signal to be sent in response to so-detecting the level state.

Various embodiments of the invention may employ any one of these actuators, any two of these actuators, or all three of these actuators. It is preferred, however, to maximize eye safety, to employ all three of these actuators, such that light source 12 will be turned off and will not emit the low-divergence light beam 22 unless and until all three of these actuators are simultaneously actuated. Thus, with all three actuators, light source 12 will not turn on unless 1) light pointer apparatus 2 is rested upon a flat surface, 2) the flat surface and thus light pointer apparatus 2 is substantially horizontal, and 3) the user has depressed the first actuator 41. With this configuration of actuators, a user would have to work very hard and deliberately to shine the low-divergence light beam 22 into his or her eye, simultaneously depressing actuators 41 and 42 while looking upward toward flat bottom surface 21 while light pointer apparatus is 2 held vertically above the user's eye and in a horizontal orientation. This is a highly unnatural, contorted set of actions and positions in which the user has to engage, which most certainly eliminates any risk of accidental, as opposed to purposeful, eye exposure. Note that in contrast, an optical computer mouse which emits high-divergence light from its bottom, is also actuated to always emit light whenever is it connected to a computer, and that the mouse buttons do not in any way actuate the light being emitted from the mouse's bottom.

Figure 5:
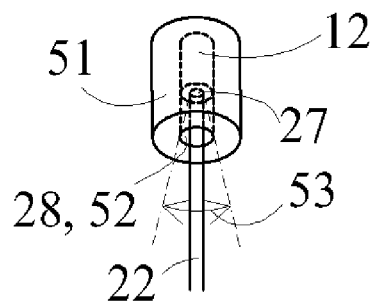
FIG. 5 illustrates the use of a field of view limiting bushing to further ensure eye safety.

FIG. 5 illustrates an additional eye safety feature, which may be employed separately or in combination with the actuator system discussed in connection with FIG. 4. In FIG. 5, light source 12 is illustrated as being encased in a field of view limiting bushing 51 comprising a bushing aperture 52 which is preferably made to coincide with bottom surface exit portal 28, set below light source exit portal 27 via which light beam 22 emanates from light source 12. This configuration, or a similar configuration within the scope of someone of ordinary skill, limits to the angle referenced as 53, the field of view from which light beam 22 can enter a person's eye. Obviously, by reducing the diameter of bushing aperture 52 as well as increasing the distance between bushing aperture 52/bottom surface exit portal 28 and light source exit portal 27, one can narrow this field of view to further render virtually to zero, the probability of accidental light exposure by the user's eye.

Returning to FIG. 4, also illustrated are a plurality of protective material 46 footings for preventing damage to the transparent or partially transparent substantially flat surface 31 from substantially flat bottom surface 21 contacting or moving over the transparent or partially transparent substantially flat surface 31. In a preferred embodiment, these protective material 46 footings comprise a soft material, such as but not limited to felt, that will deter wear to whatever transparent or partially transparent substantially flat surfaces 31 the light pointer apparatus 2 is used upon. FIG. 4 illustrates five (5) such protective material 46 footings, though it should be clear that this can be achieved with as few as three (3) such footings making triangular points of contact with the subject transparent or partially transparent substantially flat surface 31. Alternatively, it should be clear that larger portions or even virtually the entirety of substantially flat bottom surface 21 may be covered with, or fabricated from, protective material 46, with the only required exception being that there remain an opening for bottom surface exit portal 28, and, if included, for the second safety actuator 42. So that it does not cause scratching or wearing, the bottom of second safety actuator 42, if included, should also, preferably, contain a protective material 46 thereon.

Also illustrated schematically in FIG. 4, is a simple tether 47 attached to light pointer apparatus 2. The other end of this tether, not shown, may be attached to a fixed location in the mercantile establishment in which the light pointer apparatus 2 is used, so that light pointer apparatus 2 does not get misplaced or stolen. Any form of suitable tethering apparatus known in the art may be employed for this purpose.

FIG. 6 illustrates a lower-left side-front perspective view of another preferred embodiment of the invention, configured in a cuboid shape. Again, as noted earlier, it is intended that there be a reasonably-comfortable ergonomic fit with both the palm and fingers of the human hand, and easy access to the first actuator 41. The cuboid shape of the housing of light pointer apparatus 2 in FIG. 6 illustrates another shape that enables this goal to be achieved. Also, first safety actuator 41 comprises an ordinary push button, again with depression and release in the down and up direction 44, which in this illustration is substantially centered for ease of reach by the pointer finger of either a user's left or right hand.

FIG. 6 also illustrates a configuration in which the predetermined emission angle 25 of greater than 45 degrees relative to substantially flat bottom surface 21 is adjustable at will. It is to be clearly understood that this adjustability of predetermined emission angle 25 is not mutually exclusive with the variations already discussed, but can be combined with the foregoing variations in any desired combination. Particularly, as noted earlier, while it is preferred that predetermined emission angle 25 be a substantially perpendicular angle of 90 degrees, this angle may be continuously varied over the entire range running from 45 degrees to 90 degrees to better suit the particular circumstances of intended use. FIG. 6 illustrates how by providing light source 12 with a pivot and stop schematically illustrated by emission angle adjuster 61, and by providing an elongated bottom surface exit portal 28, it becomes possible to rotate and fix 62 the predetermined emission angle 25 to an angle other than 90 degrees. This results in predetermined emission angle 25 being adjustable at will.

For example, in FIG. 6, predetermined emission angle 25 is illustrated to be at a 75 degree setting. This is because in some situations, when a user moves light pointer apparatus 2 over a transparent or partially transparent substantially flat surface 31, the particular situation may be better served by an emission angle 25 other than 90 degrees. For example, if transparent or partially transparent substantially flat surface 31 is not itself horizontal, an emission angle 25 other than 90 degrees may be more optimal for the user to say "That One™." Or, the configuration or placement of objects 32 to be selected, may lend itself to other than a 90 degree emission angle 25. Similarly, depending on use, one may wish to adjust at will, the sensed orientation of the third actuator 43 in FIG. 4, which as previously discussed, comprises a level sensor for sensing an orientation of light pointer apparatus 2. The emission angle adjuster 61 is schematically illustrated in FIG. 6, because a variety of techniques are known in the art which could readily implement this feature without difficulty, including pivots with set screws, ball detentes, interlocking gears with discrete or continuous settings, screw devices which loosen, rotate, then tighten, etc. All methods within the reach of individuals of ordinary skill for achieving such an emission angle adjuster 61 functionality, are regarded to be within the scope of this disclosure and its associated claims. The foregoing at will adjustability does not preclude the possibility of manufacturing light pointer apparatus 2 with a predetermined emission angle 25 which is fixed and not adjustable, but is some angle other than 90 degrees which is at least 45 degrees.

Figure 7:
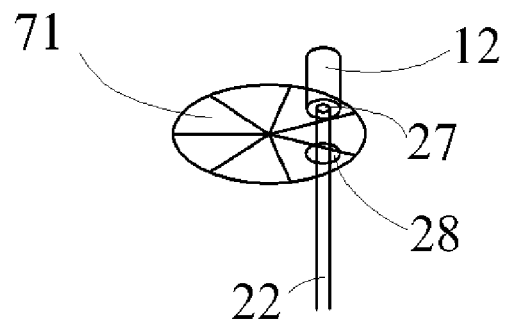
FIG. 7 is a schematic perspective illustration of light frequency selector enabling a user of the invention to select a predetermined color of light to be projected.

Finally, it may be desired to vary the color of the low-divergence light beam 22 based on, for example not limitation, the ambient lighting where the device is being used, the color of the partially transparent substantially flat surface 31, the color of the display case, and/or the colors and reflective properties of the objects 32 to be selected using light pointer apparatus 2. Of course, one can select a light source 12 to be of a fixed, predetermined color. But, if one uses a light source 12 that emits light over a range of frequencies (for example, most generally, monochromatic "white" light), then as illustrated in FIG. 7, it becomes possible to provide an optional light frequency selector 71 which filters out all but selected wavelengths and so causes light beam 22 to exhibit certain predetermined colors when that light finally reflects off a selected object 32. In the illustration of FIG. 7, light frequency selector 71 contains seven individual portions, which might be associated with passing light frequencies at each of the primary rainbow colors: red, orange, yellow, green, blue, indigo, and violet. Obviously, this is an example, not a limitation, and other colors, as well as other numbers of colors, may also be established in this way. Such a light frequency selector enables a user of light pointer apparatus 2 to select a predetermined color of light to be projected from light pointer apparatus 2, at will.

It should also be clear that the functionality schematically illustrated in FIG. 7 can be provided in many ways that will be apparent to someone of ordinary skill. A simple, rotatable wheel, such as is illustrated by light frequency selector 71, provides one way to implement this functionality. This wheel, if located inside the casing of light pointer apparatus 2, might be actuated by a second wheel, or a spindle (both not shown), that extends outside the casing. Alternatively, the state of the art for transmitting information via fiber optic technology is quite advanced, and includes various techniques by which various light frequencies can be multiplexed and demultiplexed, i.e., combined and separated, via frequency multiplexing. Clearly, these technologies can also be applied to this invention, by someone of ordinary skill, to provide this sort of at will color selectivity functionality.

The knowledge possessed by someone of ordinary skill in the art at the time of this disclosure is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

Finally, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

I claim:

1. A light pointer apparatus comprising:
   a substantially flat bottom surface comprising a sufficiently large surface area such that when said substantially flat bottom surface is rested upon a substantially flat horizontal surface, said apparatus remains substantially immobile and stable relative to the substantially flat horizontal surface solely by virtue of the plane of contact formed between said substantially flat bottom surface and the substantially flat horizontal surface;
   a light source for emitting a low-divergence light beam comprising wavelengths in the visible light spectrum with a beam divergence of at most three degrees, fixed in orientation relative to said substantially flat bottom surface so as to emit said low-divergence light beam at a predetermined emission angle of at least 45 degrees relative to the plane of said substantially flat bottom surface;
   surfaces other than said substantially flat bottom surface capable of being held and moved by a human hand; and
   said apparatus omitting any connection enabling a computerized device to recognize position or movement of said apparatus relative to the substantially flat horizontal surface; wherein:
   a user of said apparatus, by holding said surfaces other than said substantially flat bottom surface with the user's hand while said low-divergence light beam is actuated, is enabled to cause light from said low-divergence light beam to visibly strike a selected object on an opposite side of a transparent or partially transparent substantially flat surface relative to said apparatus, while said substantially flat bottom surface is in contact with the transparent or partially transparent substantially flat surface, by moving said apparatus over the transparent or partially transparent substantially flat surface and causing said low-divergence light beam to pass through the transparent or partially transparent substantially flat surface and visibly strike upon or proximate the selected object on said opposite side.

2. The light pointer apparatus of claim 1, said low-divergence light beam comprising a laser light beam.

3. The light pointer apparatus of claim 1, said predetermined emission angle comprising an emission angle of at least 60 degrees.

4. The light pointer apparatus of claim 1, said predetermined emission angle comprising an angle of at least 75 degrees.

5. The light pointer apparatus of claim 1, said predetermined emission angle comprising a substantially perpendicular angle of 90 degrees.

6. The light pointer apparatus of claim 1, further comprising an emission angle adjuster for adjusting said predetermined emission angle at will.

7. The light pointer apparatus of claim 1, said wavelengths of said low-divergence light beam producing visible, substantially white light, when said light strikes the selected object.

8. The light pointer apparatus of claim 1, said wavelengths of said low-divergence light beam producing a visible predetermined color of light, other than white light, when said light visibly strikes the selected object.

9. The light pointer apparatus of claim 1, further comprising a light frequency selector for selecting at will, a predetermined color of light to be projected from said apparatus.

10. The light pointer apparatus of claim 1, further comprising a safety actuator for causing said light source to emit said low-divergence light beam only when said safety actuator is actuated, and for ceasing emission of said low-divergence light beam whenever said safety actuator is not actuated.

11. The light pointer apparatus of claim 10, further comprising said safety actuator configured to be actuated by the user's hand.

12. The light pointer apparatus of claim 11, further comprising:
said surfaces other than said substantially flat bottom surface configured to be substantially similar to the surfaces of a computer mouse which are held and moved by a human hand; and
a safety actuator configured to be substantially similar to a computer mouse button.

13. The light pointer apparatus of claim 10, further comprising said safety actuator configured to be actuated by said substantially flat bottom surface contacting the transparent or partially transparent substantially flat surface.

14. The light pointer apparatus of claim 10, further comprising said safety actuator comprising a level sensor for sensing an orientation of said light pointer apparatus, and actuating only when said light pointer apparatus is sensed to be in a predetermined orientation.

15. The light pointer apparatus of claim 14, wherein said predetermined orientation is substantially horizontal.

16. The light pointer apparatus of claim 14, wherein said predetermined orientation is configurable at will.

17. The light pointer apparatus of claim 1, further comprising two safety actuators for causing said light source to emit said low-divergence light beam only when said both of safety actuators are actuated, and for ceasing emission of said low-divergence light beam whenever either one of said two safety actuators is not actuated.

18. The light pointer apparatus of claim 17, further comprising:
a first one of said two safety actuators configured to be actuated by the user's hand; and
a second one of said two safety actuators configured to be actuated by said substantially flat bottom surface contacting the transparent or partially transparent substantially flat surface.

19. The light pointer apparatus of claim 18, further comprising:
said surfaces other than said substantially flat bottom surface configured to be substantially similar to the surfaces of a computer mouse which are held and moved by a human hand; and
said first one of said two safety actuators configured to be substantially similar to a computer mouse button.

20. The light pointer apparatus of claim 17, further comprising:
a first one of said two safety actuators configured to be actuated by the user's hand; and
a second one of said two safety actuators comprising a level sensor for sensing an orientation of said light pointer apparatus, and actuating only when said light pointer apparatus is sensed to be in a predetermined orientation.

21. The light pointer apparatus of claim 20, further comprising:
said surfaces other than said substantially flat bottom surface configured to be substantially similar to the surfaces of a computer mouse which are held and moved by a human hand; and
said first one of said two safety actuators configured to be substantially similar to a computer mouse button.

22. The light pointer apparatus of claim 1, further comprising three safety actuators for causing said light source to emit said low-divergence light beam only when all three of said safety actuators are actuated, and for ceasing emission of said low-divergence light beam whenever any one of said three safety actuators is not actuated.

23. The light pointer apparatus of claim 22, further comprising:
a first one of said three safety actuators configured to be actuated by the user's hand; and
a second one of said three safety actuators configured to be actuated by said substantially flat bottom surface contacting the transparent or partially transparent substantially flat surface; and
a third one of said three safety actuators comprising a level sensor for sensing an orientation of said light pointer apparatus, and actuating only when said light pointer apparatus is sensed to be in a predetermined orientation.

24. The light pointer apparatus of claim 1, further comprising said surfaces other than said substantially flat bottom surface configured to be substantially similar to the surfaces of a computer mouse which are held and moved by a human hand.

25. The light pointer apparatus of claim 1, said substantially flat bottom surface comprising protective material for preventing damage to said transparent or partially transparent substantially flat surface from said substantially flat bottom surface contacting or moving over the transparent or partially transparent substantially flat surface.

26. The light pointer apparatus of claim 1, further comprising a field of view limiting bushing for reducing a field of view from which said low-divergence light beam can enter an eye of the user.

27. A method for causing light to visibly strike upon or proximate a selected object on an opposite side of a transparent or partially transparent substantially flat surface relative to a light pointer apparatus, comprising:

providing said light pointer apparatus comprising: a substantially flat bottom surface comprising a sufficiently large surface area such that when said substantially flat bottom surface is rested upon a substantially flat horizontal surface, said apparatus remains substantially immobile and stable relative to the substantially flat horizontal surface solely by virtue of the plane of contact formed between said substantially flat bottom surface and the substantially flat horizontal surface; a light source for emitting a low-divergence light beam comprising wavelengths in the visible light spectrum with a beam divergence of at most three degrees, fixed in orientation relative to said substantially flat bottom surface so as to emit said low-divergence light beam at a predetermined emission angle of greater than 45 degrees relative to the plane of said substantially flat bottom surface; and surfaces other than said substantially flat bottom surface capable of being held and moved by a human hand;

holding said surfaces other than said substantially flat bottom surface with a user's hand while said low-divergence light beam is actuated and while said substantially flat bottom surface is in contact with the transparent or partially transparent substantially flat surface;

moving said apparatus over the transparent or partially transparent substantially flat surface and causing said low-divergence light beam to pass through the transparent or partially transparent substantially flat surface and cause said light to visibly strike upon or proximate the selected object on said opposite side.

28. The method of claim 27, said low-divergence light beam comprising a laser light beam.

29. The method of claim 27, said predetermined emission angle comprising an emission angle of at least 60 degrees.

30. The method of claim 27, said predetermined emission comprising an angle of at least 75 degrees.

31. The method of claim 27, said predetermined emission angle comprising a substantially perpendicular angle of 90 degrees.

32. The method of claim 27, further comprising adjusting said predetermined emission angle at will.

33. The method of claim 27, wherein said wavelengths of said low-divergence light beam produce visible, substantially white light, when said light strikes the selected object.

34. The method of claim 27, wherein said wavelengths of said low-divergence light beam produce a visible predetermined color of light, other than white light, when said light visibly strikes the selected object.

35. The method of claim 27, further comprising selecting at will, a predetermined color of light to be projected from said apparatus.

36. The method of claim 27, further comprising causing said light source to emit said low-divergence light beam only when a safety actuator is actuated, and for ceasing emission of said low-divergence light beam whenever said safety actuator is not actuated.

37. The method of claim 36, further comprising actuating said safety actuator by the user's hand.

38. The method of claim 36, further comprising actuating said safety actuator by said substantially flat bottom surface contacting the transparent or partially transparent substantially flat surface.

39. The method of claim 36, further comprising actuating said safety actuator only when said light pointer apparatus is sensed to be in a predetermined orientation.

40. The method of claim 39, wherein said predetermined orientation is substantially horizontal.

41. The method of claim 39, further comprising configuring said predetermined orientation at will.

42. The method of claim 27, further comprising causing said light source to emit said low-divergence light beam only when said both of two safety actuators are actuated, and for ceasing emission of said low-divergence light beam whenever either one of said two safety actuators is not actuated.

43. The method of claim 42, further comprising:
actuating a first one of said two safety actuators by the user's hand; and
actuating a second one of said two safety actuators by said substantially flat bottom surface contacting the transparent or partially transparent substantially flat surface.

44. The method of claim 43, further comprising:
holding and moving by a human hand, said surfaces other than said substantially flat bottom surface, wherein said surfaces are configured to be substantially similar to the surfaces of a computer mouse; and
actuating said first one of said two safety actuators with a human finger, wherein said first safety actuator is configured to be substantially similar to a computer mouse button.

45. The method of claim 42, further comprising:
actuating a first one of said two safety actuators by the user's hand; and
actuating a second one of said two safety actuators only when said light pointer apparatus is sensed to be in a predetermined orientation.

46. The method of claim 45, further comprising:
holding and moving by a human hand, said surfaces other than said substantially flat bottom surface, wherein said surfaces are configured to be substantially similar to the surfaces of a computer mouse; and
actuating said first one of said two safety actuators with a human finger, wherein said first safety actuator is configured to be substantially similar to a computer mouse button.

47. The method of claim 27, further comprising causing said light source to emit said low-divergence light beam only when all three of three safety actuators are actuated, and for ceasing emission of said low-divergence light beam whenever any one of said three safety actuators is not actuated.

48. The method of claim 47, further comprising:
actuating a first one of said three safety actuators by the user's hand; and
actuating a second one of said three safety actuators by said substantially flat bottom surface contacting the transparent or partially transparent substantially flat surface; and
actuating a third one of said three safety actuators only when said light pointer apparatus is sensed to be in a predetermined orientation.

49. The method of claim 27, further comprising holding and moving by a human hand, said surfaces other than said substantially flat bottom surface, wherein said surfaces are configured to be substantially similar to the surfaces of a computer mouse.

50. The method of claim 49, further comprising:
holding and moving by a human hand, said surfaces other than said substantially flat bottom surface, wherein said surfaces are configured to be substantially similar to the surfaces of a computer mouse; and
actuating a safety actuator with a human finger, wherein said safety actuator is configured to be substantially similar to a computer mouse button.

51. The method of claim 27 further comprising preventing damage to said transparent or partially transparent substantially flat surface from said substantially flat bottom surface contacting or moving over the transparent or partially transparent substantially flat surface, using a protective material of said substantially flat bottom surface.

52. The method of claim 27, further comprising reducing a field of view from which said low-divergence light beam can enter an eye of the user, using a field of view limiting bushing.

53. A light pointer apparatus comprising:
- a substantially flat bottom surface of at least three square inches in surface area;
- a light source for emitting a low-divergence light beam fixed in orientation relative to said substantially flat bottom surface so as to emit said low-divergence light beam at a predetermined emission angle of at least 45 degrees relative to a plane of said substantially flat bottom surface; and
- said apparatus omitting any connection enabling a computerized device to recognize position or movement of said apparatus relative to a substantially flat horizontal surface upon which said substantially flat bottom surface is rested.

* * * * *